United States Patent
Liu et al.

(10) Patent No.: US 11,949,226 B2
(45) Date of Patent: Apr. 2, 2024

(54) EXTERNAL POWER SUPPLY SYSTEM FOR SPINDLE

(71) Applicant: NATIONAL CHUNG HSING UNIVERSITY, Taichung (TW)

(72) Inventors: Chien-Hung Liu, Taichung (TW); Yu-Hung Li, Changhua (TW)

(73) Assignee: NATIONAL CHUNG HSING UNIVERSITY, Taichung (TW)

(*) Notice: Subject to any disclaimer, the term of this patent is extended or adjusted under 35 U.S.C. 154(b) by 486 days.

(21) Appl. No.: 17/378,976

(22) Filed: Jul. 19, 2021

(65) Prior Publication Data

US 2022/0037874 A1    Feb. 3, 2022

(30) Foreign Application Priority Data

Jul. 28, 2020 (TW) ................. 109125743

(51) Int. Cl.
| | |
|---|---|
| *H02M 1/12* | (2006.01) |
| *B06B 3/00* | (2006.01) |
| *H01H 13/64* | (2006.01) |
| *H02H 1/00* | (2006.01) |
| *H02H 7/09* | (2006.01) |
| *H02M 7/04* | (2006.01) |

(52) U.S. Cl.
CPC ............ *H02H 7/09* (2013.01); *H02H 1/0007* (2013.01); *H02M 7/04* (2013.01)

(58) Field of Classification Search
CPC ............ B06B 3/00; H01H 13/64; H02M 1/12
See application file for complete search history.

(56) References Cited

U.S. PATENT DOCUMENTS

2018/0250758 A1    9/2018    Jiang et al.

FOREIGN PATENT DOCUMENTS

| CN | 202528012 U | 11/2012 |
|---|---|---|
| CN | 203901021 A | 10/2014 |
| CN | 104138831 A | 11/2014 |
| CN | 104148994 A | 11/2014 |
| CN | 105234437 A | 1/2016 |
| CN | 106334806 A | 1/2017 |
| CN | 205852411 U | 1/2017 |
| CN | 107662288 A | 2/2018 |
| CN | 108380473 A | 8/2018 |
| CN | 208556901 U | 3/2019 |

(Continued)

*Primary Examiner* — Kawing Chan
*Assistant Examiner* — Charles S Laughlin
(74) *Attorney, Agent, or Firm* — Best & Flanagan LLP

(57) ABSTRACT

An external power supply system for spindles is revealed. The external power supply system includes a tool holder, a rectifier circuit, an overvoltage protection circuit, and a buck/boost converter. The tool holder receives an external power source of a spindle while the rectifier circuit converts the external power source into a rectified output signal with a power factor through step-down transformation. The overvoltage protection circuit is used to check whether the rectified output signal is larger than an overvoltage signal for outputting an operating potential or a non-operating potential. The buck/boost converter is used for receiving the rectified output signal with the power factor and converting the rectified output signal to an output voltage according to the power factor. Then the output voltage is provided to a load of a low voltage power supply, a high voltage power supply, or a constant voltage power supply.

3 Claims, 14 Drawing Sheets

(56) References Cited

FOREIGN PATENT DOCUMENTS

| | | | |
|---|---|---|---|
| CN | 110038784 | A | 7/2019 |
| JP | H03239408 | A | 10/1991 |
| JP | H05208349 | A | 8/1993 |
| JP | 2007030114 | A | 2/2007 |
| JP | 2008023693 | A | 2/2008 |
| JP | 2008093766 | A | 4/2008 |
| JP | 2008093784 | A | 4/2008 |
| JP | 2010194650 | A | 9/2010 |
| JP | 2011152605 | A | 8/2011 |
| KR | 20180020865 | A | 2/2018 |
| TW | 591962 | B | 6/2004 |
| TW | I301353 | B | 9/2008 |
| TW | I301354 | B | 9/2008 |
| TW | M382663 | U | 6/2010 |
| TW | M400930 | U | 4/2011 |
| TW | M428011 | U | 5/2012 |
| TW | M431039 | U | 6/2012 |
| TW | M432499 | U | 7/2012 |
| TW | I380876 | B | 1/2013 |
| TW | I387500 | B | 3/2013 |
| TW | M454888 | U | 6/2013 |
| TW | M455583 | U | 6/2013 |
| TW | I415691 | B | 11/2013 |
| TW | M465987 | U | 11/2013 |
| TW | M489750 | U | 11/2014 |
| TW | I513536 | B | 12/2015 |
| TW | I519017 | B | 1/2016 |
| TW | I566062 | B | 1/2017 |
| TW | M569670 | U | 11/2018 |
| TW | I651178 | B | 2/2019 |
| TW | M575744 | U | 3/2019 |
| TW | I657869 | B | 5/2019 |
| TW | M581960 | U | 8/2019 |
| TW | I672192 | B | 9/2019 |

EXTERNAL POWER SUPPLY SYSTEM FOR SPINDLE

BACKGROUND OF THE INVENTION

Field of the Invention

The present invention relates to an external power supply system, especially to an external power supply system which provides spindles wireless power transfer by conversion between electric energy and magnetic energy.

Description of Related Art

A conventional ultrasonic transducer such as the one revealed in Taiwanese Pat. App. No. 097110657 features on a long horn 2, a counterweight 3, two piezoelectric driving parts 4, 5 and a screw 6. The counterweight is fixed on the horn by the screw so that the piezoelectric driving parts are clipped between the horn and the counterweight and arranged at each side of an axis 7 of the ultrasonic converter. The ultrasonic transducer is designed in the way that a tip of a capillary clamped in the horn can vibrate in two different directions.

Refer to Taiwanese Pat. App. No. 094141170, a conventional tool unit for ultrasonically assisted rotary machining of a workpiece mainly includes a converter including at least one electroacoustic transducer for generating and transmitting ultrasonic oscillations, a tool that is coupled to the converter, and a holder in which the converter including the transducer is arranged and which is insertable at least partially in the retainer of a tool spindle and connectable thereto by means of a detachable connection.

As to external power suppliers for spindles available now, please refer to Taiwanese Pat. Pub. No. 591962, No. 1301353, No. 1301354, No. 1380876, No. 1387500, No. 1415691, No. 1513536, No. 1519017, No. 1566062, No. 1651178, No. 1657869, No. 1672192, No. M382663, No. M400930, No. M428011, No. M431039, No. M432499, No. M454888, No. M455583, No. M465987, No. M489750, No. M569670, No. M575744, No. M581960, Chinese Pat. Pub. No. 110038784, No. 208556901, No. 108380473, No. 107662288, No. 106334806, No. 205852411, No. 105234437, No. 104148994, No. 104138831, No. 203901021, No. 202528012, Japanese Pat. Pub. No. JPH05208349, No. JPH03239408, No. 2007030114, No. 2008023693, No. 2008093766, No. 2008093784, No. 2010194650, No. 2011152605, Korean Pat. Pub. No. 20180020865, and US Pat. Pub. No. 2018250758, each of which has its own problems. An external power supply for spindles of the present invention can not only perform wireless charging and wireless power receiving but also carry out energy conversion up to 90%. Thus the present external power supply for spindles is quite practical.

SUMMARY OF THE INVENTION

Therefore, it is a primary object of the present invention to provide an external power supply system which generates output voltages stably for providing different electric powers to spindles.

It is another object of the present invention to provide an external power supply system for spindles in which energy supply between an external power source and a load is achieved in a non-contact manner and data transmission at any point during the period with field gap is ensured.

In order to achieve the above objects, an external power supply system for a spindle according to the present invention includes a tool holder, a rectifier circuit, an overvoltage protection circuit, and a buck/boost converter. The spindle is connected to a drive system which generates an electric field with a power factor and transfers the electric field to a positive electrode and a negative electrode.

The tool holder consists of a pull stud, an exterior conical surface, an end ring, a contact positive electrode, and a contact negative electrode. The contact positive and negative electrodes are mounted to the exterior conical surface or a surface of the end ring for transferring an external power source while being aligned with the positive and negative electrodes of the spindle and receiving the external power source with the power factor.

The rectifier circuit is used to convert the external power source into a rectified output signal through step-down transformation. The rectifier circuit allows a transmission level to pass according to a contact potential input by the external power source, applies proportioning control with integral and derivative functions to an output waveform of the transmission level, and then transforms a modulation level which is used for control of the transmission level of the rectified output signal with the power factor to be no larger than a threshold.

The overvoltage protection circuit is used to check whether the rectified output signal is larger than an overvoltage signal. When the rectified output signal is smaller than the overvoltage signal, the overvoltage signal is at an operating potential. The overvoltage signal is at a non-operating potential once the rectified output signal is larger than the overvoltage signal.

The buck/boost converter is coupled to the overvoltage protection circuit for receiving the rectified output signal output at the operating potential and converting the rectified output signal to an output voltage according to the power factor of the rectified output signal. Then the output voltage is provided to a load of a low voltage power supply, a high voltage power supply, or a constant voltage power supply.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
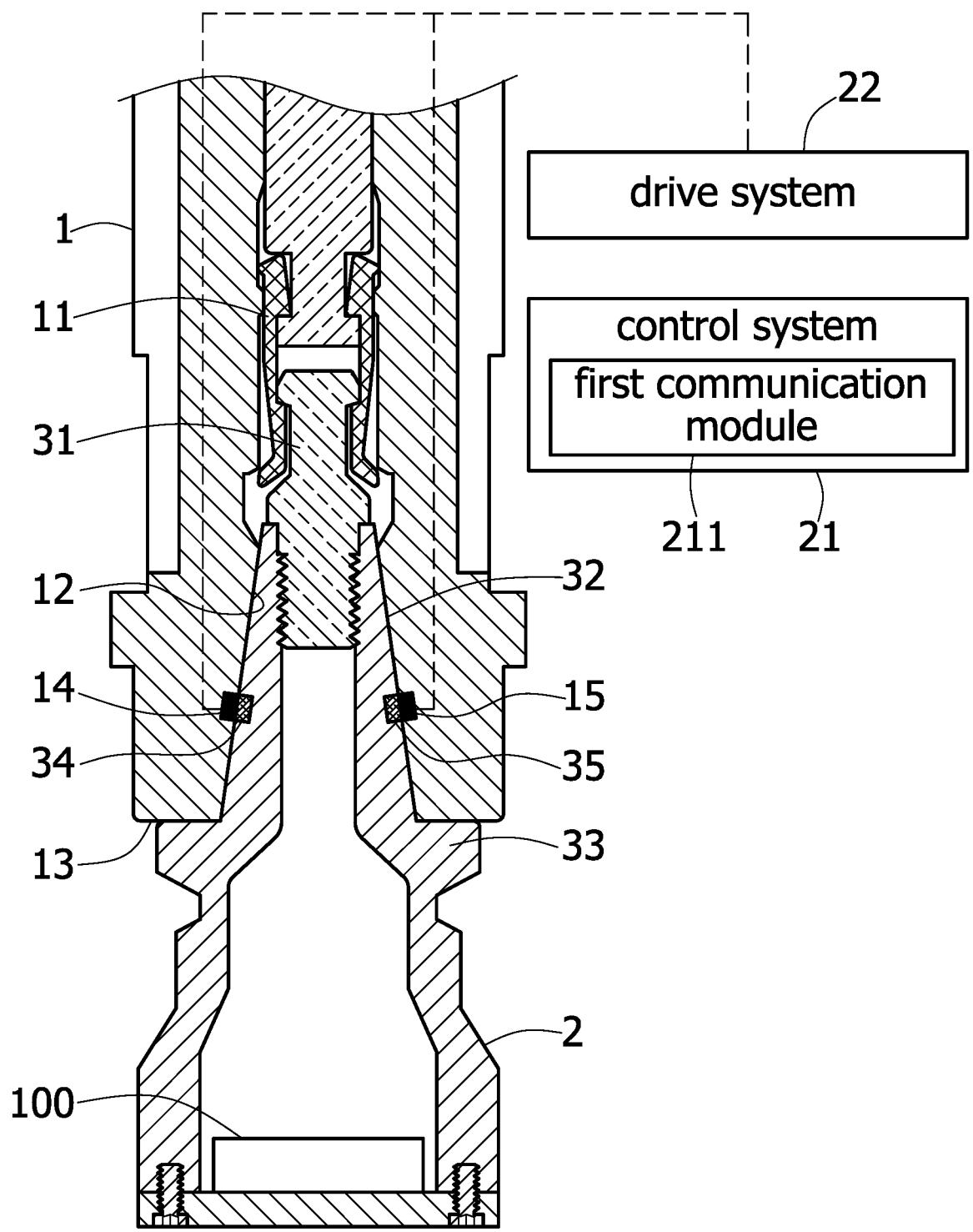
FIG. 1 is a schematic drawing showing an external power source is transferred from a spindle to an embodiment according to the present invention.
Figure 2:
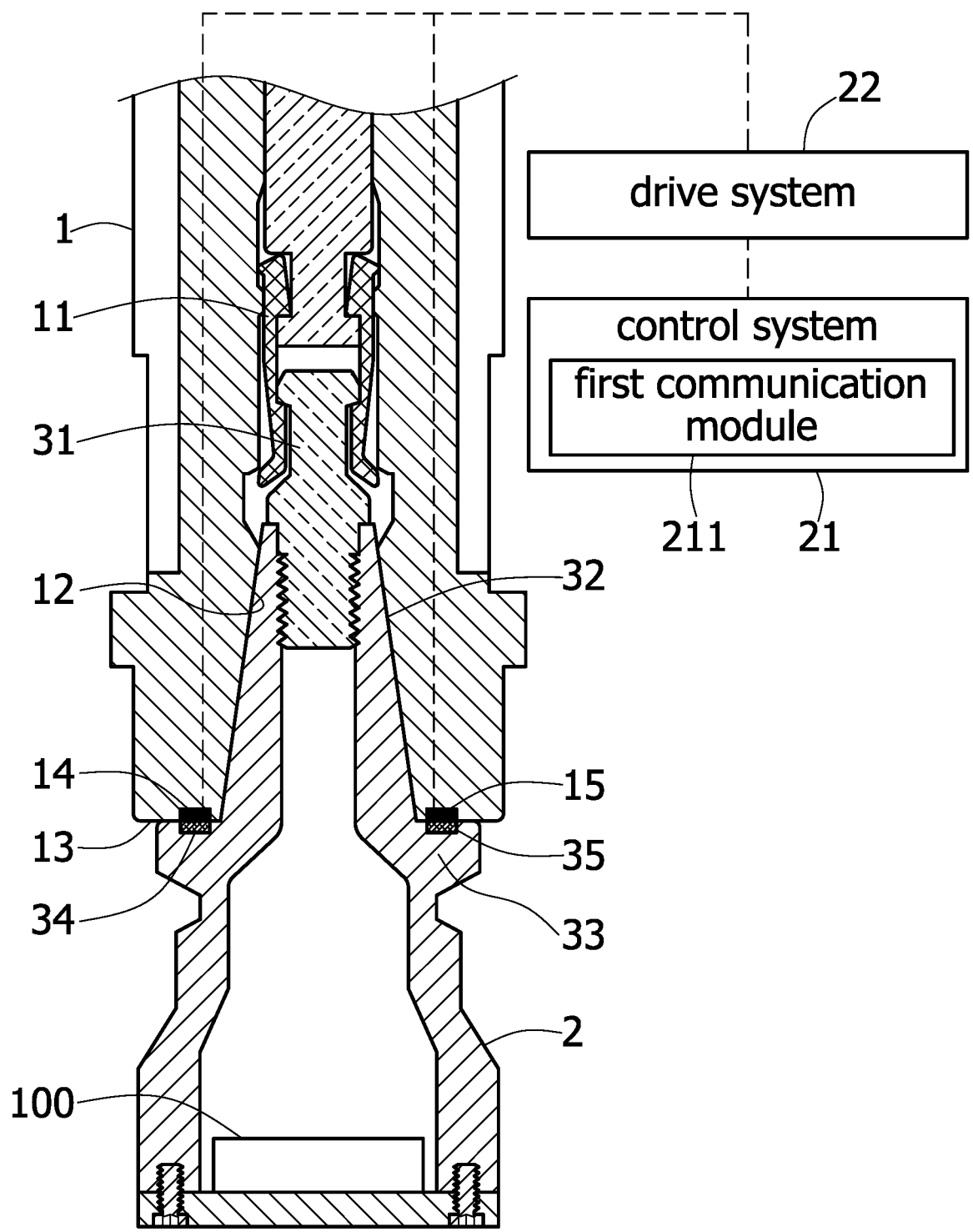
FIG. 2 is another schematic drawing showing an external power source is transferred from a spindle to an embodiment according to the present invention.
Figure 3:
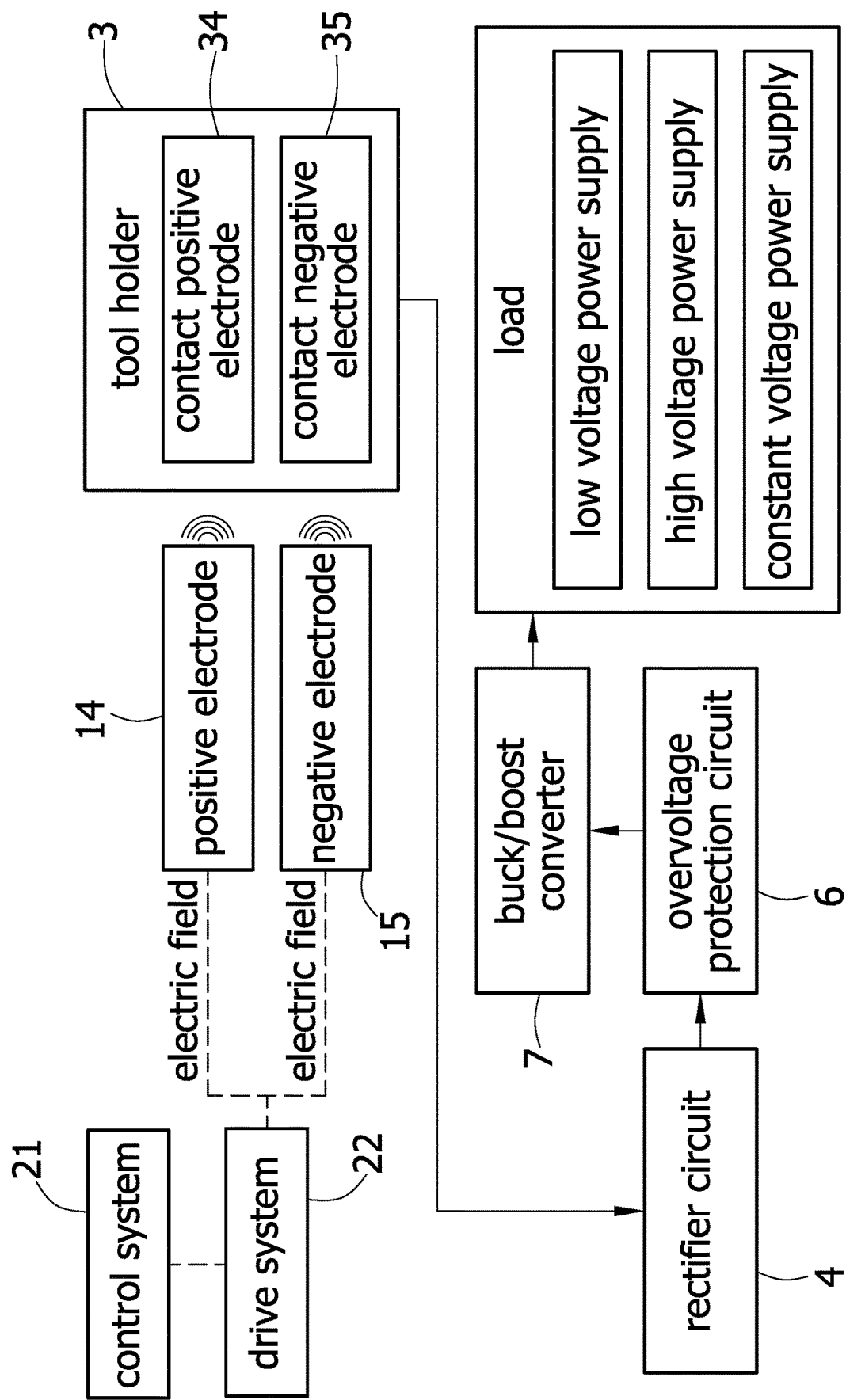
FIG. 3 is a block diagram showing a circuit of an embodiment according to the present invention.

Refer to FIG. 1-3, an embodiment of an external power supply system for a spindle 1 (or an ultrasonic spindle) according to the present invention is revealed.

The spindle 1 is connected to a controlling system 21 which not only provides actuating power to a drive system 22 of the spindle 1 and an equidistant firing control for control of a DC (direct current) trigger to deal with at least one trigger event, but also receives a triggering signal through a first communication module 211. The drive system 22 can generate an electric field (or an electromotive field) which is having a power factor and transferred to a positive electrode 14 and a negative electrode 15 both disposed on a conical surface 12 (or a contact surface 13) of a hollow main bush. A jaw 11 which feeds vertically is disposed on an upper part of the hollow main bush. The drive system 22 is built with a voltage stabilizing circuit 74 therein for keeping a constant potential of the electric field (or the electromotive field). The external power supply system further includes a tool holder 3, a rectifier circuit 4, an overvoltage protection circuit 6, and a buck/boost converter 7.

Figure 4:
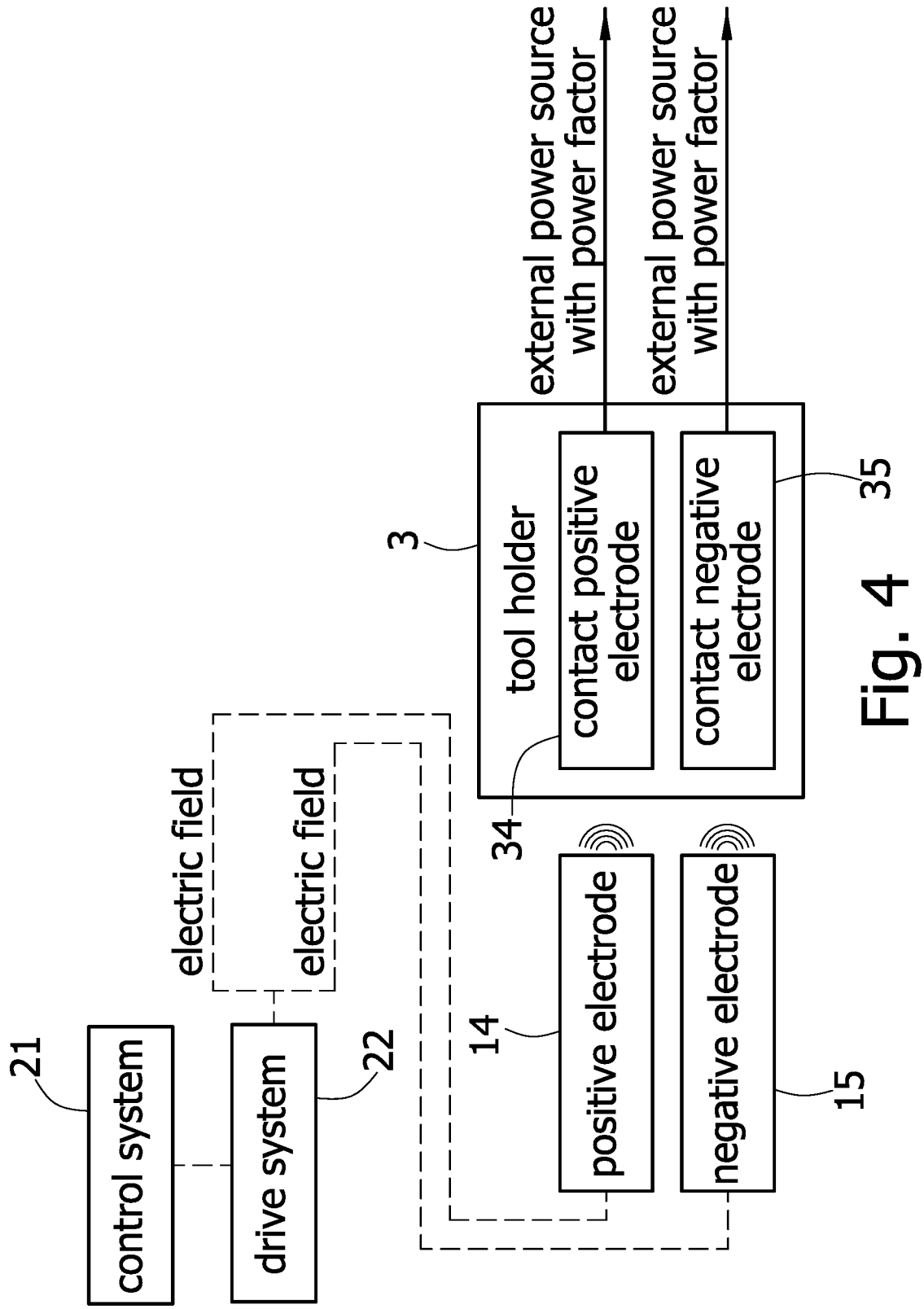
FIG. 4 is a block diagram showing a circuit of a tool holder of an embodiment according to the present invention.

The tool holder 3 consists of a pull stud 31, an exterior conical surface 32, an end ring 33, a contact positive electrode 34, and a contact negative electrode 35. The contact positive and the contact negative electrodes 34, 35 can be mounted to the exterior conical surface 32 or a surface of the end ring 33 (as shown in FIG. 2). The contact positive electrode 34 and the contact negative electrode 35 can also be a noncontact positive electrode 34 and a noncontact negative electrode 35 respectively. When the claw 11 is moved upward axially, the pull stud 31 is held by the claw 11 to make the positive electrode 14 and the negative electrode 15 of the spindle 1 align with the contact positive electrode 34 and the contact negative electrode 35 of the tool holder 3 and an electric field gap is generated simultaneously for transferring an external power source (such as power source AC30V-80V). The electric field (or an electromotive field) having the power factor transfers and supplies the external power source with the power factor to the contact positive electrode 34 and the contact negative electrode 35 through the positive electrode 14 and the negative electrode 15. As shown in FIG. 4, an external power supply 100 is mounted in the tool holder 3.

The contact positive electrode 34 (or noncontact positive electrode 34) in combination with the contact negative electrode 35 (or noncontact negative electrode 35) forms a contact induction coil which receives the external power source from the positive electrode 14 and the negative electrode 15 through an electromagnetic induction. Or a noncontact induction coil is formed by the noncontact positive electrode 34 and the noncontact negative electrode 35.

Figure 5:
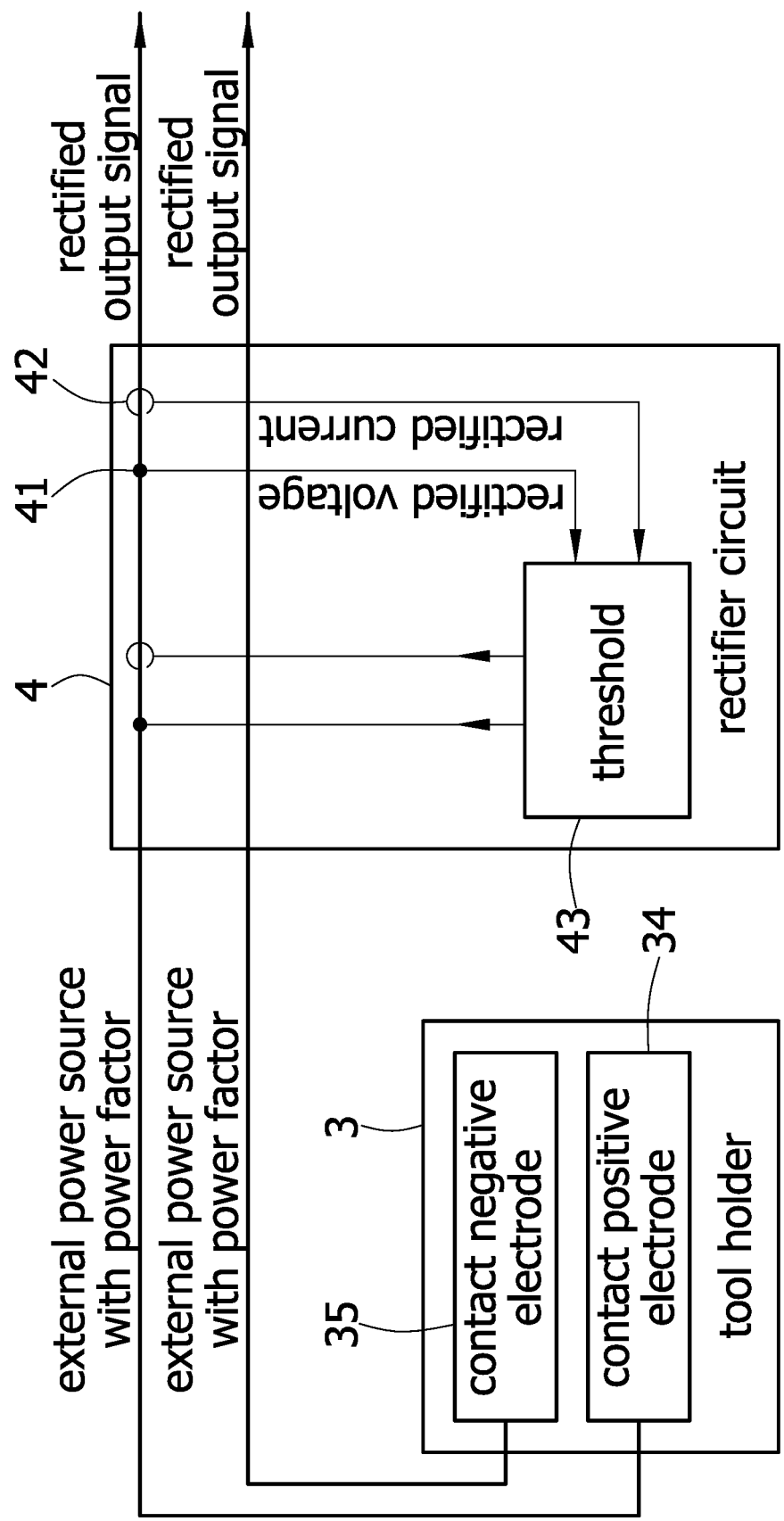
FIG. 5 is a block diagram showing a circuit of a rectifier circuit of an embodiment according to the present invention.

As shown in FIG. 5, the rectifier circuit 4 is used for converting the external power source containing the power factor into a rectified output signal with the power factor through step-down transformation. The rectified output signal with the power factor includes a rectified voltage 41 and a rectified current 42. The rectifier circuit 4 allows a transmission level to pass according to a contact potential input by the external power source, applies proportioning control with integral and derivative functions to an output waveform of the transmission level, and then transforms a modulation level 5 which is used for control of the transmission level of both the rectified voltage 41 and the rectified current 42 of the rectified output signal with the power factor to be no larger than a threshold 43.

The overvoltage protection circuit 6 is used to check whether the rectified output signal with the power factor is larger than an overvoltage signal 61 within a continuous conduction time. When the rectified output signal with the power factor is smaller than the overvoltage signal 61, the value of the overvoltage signal 61 is an operating potential 62. Once the rectified output signal with the power factor is larger than the overvoltage signal 61, the overvoltage signal 61 is at a non-operating potential 63.

The buck/boost converter 7 is coupled to the overvoltage protection circuit 6 for receiving the rectified output signal with the power factor output at the operating potential 62 and converting the rectified output signal to an output voltage according to the power factor. Then the output voltage is provided to a load of a low voltage power supply, a high voltage power supply, or a constant voltage power supply. The buck/boost converter 7 uses a Zener diode to convert the rectified output signal with the power factor to the output voltage required by the load of the low voltage power supply (such as +3.3V power source, −3.3V power source, +5V power source, −5V power source, etc.), of the high voltage power supply (such as 24V power source), or of the constant voltage power supply (such as 12V power source). The buck/boost converter 7 is a voltage regulator circuit.

During normal operation of the drive system 22, transmission of the power factor, and data transmission, the voltage generated by the external power source is larger than the total voltage provided to the contact positive electrode 34 and the contact negative electrode 35 when the electric field (or an electromotive field)) is smaller than a tolerance band. Once the electric field (or the electromotive field) is larger than the tolerance band, the voltage generated by the drive system 22 is decreased and the drive system 22 decouples the electric field (or the electromotive field). Thereby the electric field (or the electromotive field) is not only unable to pull the electric power out of the contact positive electrode 34 and the contact negative electrode 35, but also unable to transfer the electric power to the rectifier circuit 4 through the contact positive electrode 34 and the contact negative electrode 35.

The external power source is an external current or an external field. In practice, the external power source is defined as transfer of the power factor and energy performed by an induced electric signal of a time-varying magnetic field when the positive electrode 14 and the negative electrode 15 are aligned with the contact positive electrode 34 and the contact negative electrode 35. The above external power source (external current or external field) with the power factor is received by the contact positive electrode 34 and the contact negative electrode 35 through electromagnetic induction when the electric field (or the electromotive field) performs transmission through the positive electrode 14 and the negative electrode 15 (as delivery ends) aligned with the contact positive electrode 34 and the contact negative electrode 35 (as receiving ends). In practice, the noncontact induction coil activates the contact positive electrode 34 and the contact negative electrode 35 to receive the external power source (the external current or the external field) by electromagnetic induction.

Refer to FIG. 2, the drive system 22 of the spindle 1 can also provide the electric field (or the electromotive field) to the contact positive electrode 34 and the contact negative electrode 35 in the tool holder 3. The electric field (or the electromotive field) is shown in an output of the drive system 22 and the output is connected and supplied to the contact positive electrode 34 and the contact negative electrode 35 of the tool holder 3. Under such condition, an output side of the positive electrode 14 and an output side of the negative electrode 15 of the spindle 1 are aligned with and connected to the contact positive electrode 34 and the contact negative electrode 35 correspondingly. Then the electric field (or the electromotive field) can continuously generate and supply the external power source with the power factor to the contact positive electrode 34 and the contact negative electrode 35 through the positive electrode 14 and the negative electrode 15.

According to a purpose of the present invention, the electric field (or the electromotive field) will not be affected by the contact positive electrode 34 and the contact negative electrode 35 in the tool holder 3. Thus the drive system 22 performs the decoupling of the electric field (or the electromotive field) while the electric field (or the electromotive field) of the tool holder 3 is beyond a tolerance band.

When the positive electrode 14 and the negative electrode 15 (as delivery ends) are aligned and strongly coupled with the contact positive electrode 34 and the contact negative electrode 35 (as receiving ends), the contact positive electrode 34 and the contact negative electrode 35 can only pull out a little amount of the external power source during transmission of the power factor and data. The external power source is supplied from the positive electrode 14 and the negative electrode 15 to the contact positive electrode 34 and the contact negative electrode 35 during the period with the field gap. The electric field (or the electromotive field) between the spindle 1 and the tool holder 3 can also provide a rectified voltage threshold 51 (or a rectified current threshold 53) required.

As shown in FIG. 3 and FIG. 4, the contact positive electrode 34 and the contact negative electrode 35 receive the external power source (the external current or the external field) by electromagnetic induction and deliver the external power source with the power factor to the rectifier circuit 4. Then the rectifier circuit 4 receives the external power source by coupling, induction, or catching, but not limited to theses ways. In practice, the external power source is defined as transfer of the power factor and the energy performed by an induced electric signal of a time-varying magnetic field. The external power source is the external power source with the power factors sent by the drive system 22 from the positive electrode 14 and the negative electrode 15 of the spindle 1 to the contact positive electrode 34 and the contact negative electrode 35 of the tool holder 3 while the positive and the negative electrodes 14, 15 and the contact positive and the contact negative electrodes 34, 35 being aligned with each other. In practice, the contact positive electrode 34 and the contact negative electrode 35 of the tool holder 3 receive the external power source with the power factor due to electromagnetic induction while sensing the external power source and then transfer the external power source (external current or external field) to the rectifier circuit 4.

As shown in FIG. 5, the rectifier circuit 4 can be a half-wave rectifier, a bridge rectifier, or a center tap rectifier used for converting the external power source containing the power factor into a rectified output signal with the power factor through step-down transformation. The external power source containing the power factor includes a rectified voltage 41 and a rectified current 42. Thereby the transfer of the external power source (external current or external field) containing the power factor is achieved. In FIG. 5, the rectifier circuit 4 allows a transmission level to pass according to a contact potential input by the external power source, applies proportioning control with integral and derivative functions to output waveform of the transmission level (or uses a proportional, integral and derivative circuit generally formed by resistors and capacitors, or resistors and inductors), and then transforms a modulation level 5 which is used to control the transmission level of both the rectified voltage 41 and the rectified current 42 of the rectified output signal with the power factor and make the transmission level no larger than a threshold 43.

Figure 6:
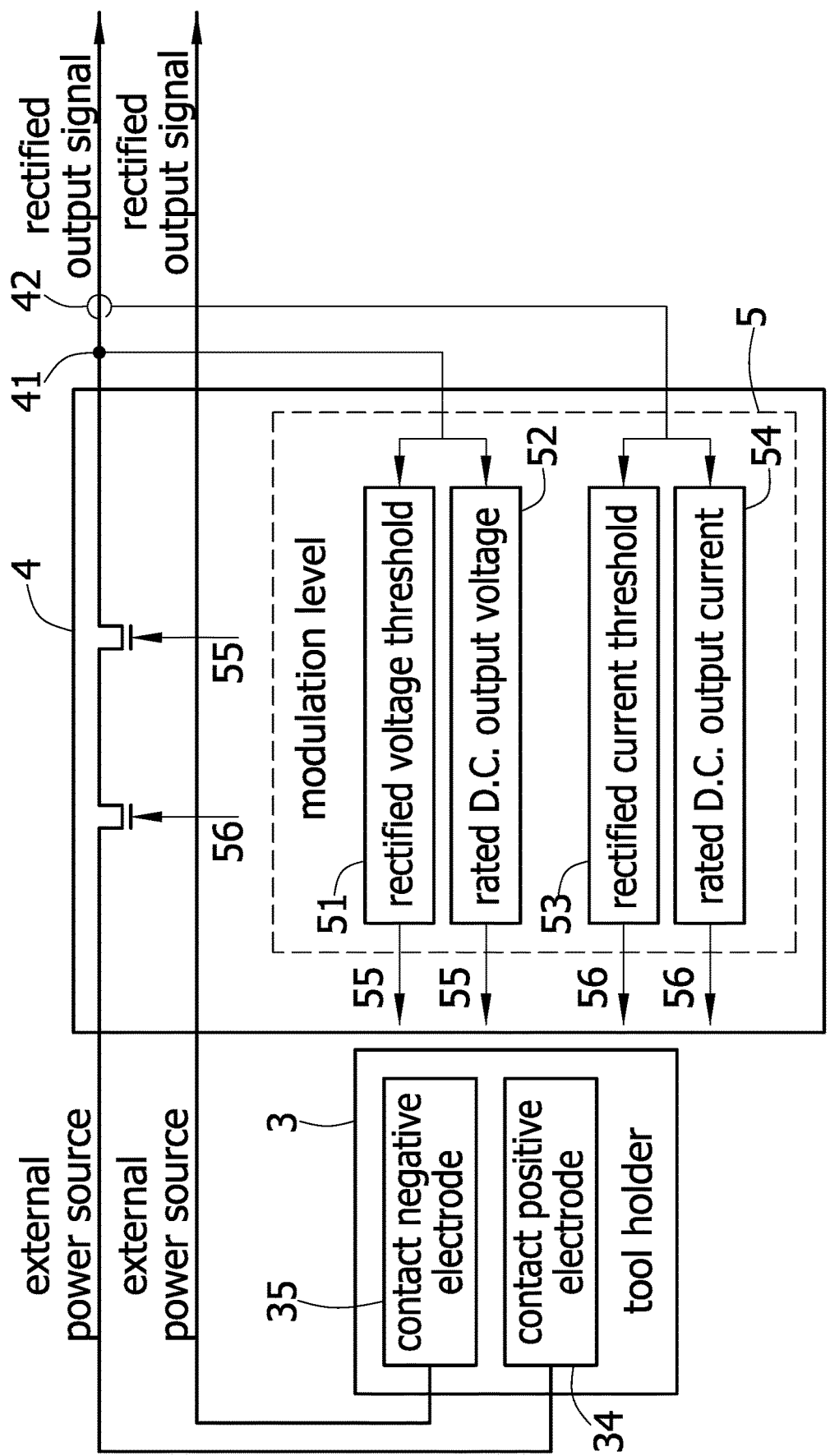
FIG. 6 is a block diagram of a rectifier circuit with a modulation level of an embodiment according to the present invention.

Refer to FIG. 6, the rectifier circuit 4 uses the modulation level 5 to provide at least one of the following four functions. First, limit the transmission level of the rectified voltage 41 and make the transmission level of the rectified voltage 41 not larger than a rectified voltage threshold 51. Second, limit the transmission level of the rectified current 42 and make the transmission level of the rectified current 42 not larger than a rectified current threshold 53. Adjust the transmission level of the rectified voltage 41 to be corresponding to a rated direct current (D.C.) output voltage 52. Adjust the transmission level of the rectified current 42 to be corresponding to a rated D.C. output current 54. The rectifier circuit 4 limits or adjusts the transmission level of the rectified voltage 41 or the rectified current 42 by the modulation level 5. When the transmission level of the rectified voltage 41 is larger than the rectified voltage threshold 51 or the rated D.C. output voltage 52, a first equalizer circuit 55 starts to work. When the transmission level of the rectified current 42 is larger than the rectified current threshold 53 or the rated D.C. output current 54, a second equalizer circuit 56 starts to work. The modulation level 5 is used to limit or adjust the transmission level of the rectified voltage 41 or the rectified current 42 for further limit or adjustment of the rectified voltage 41 or the rectified current 42.

Figure 7:
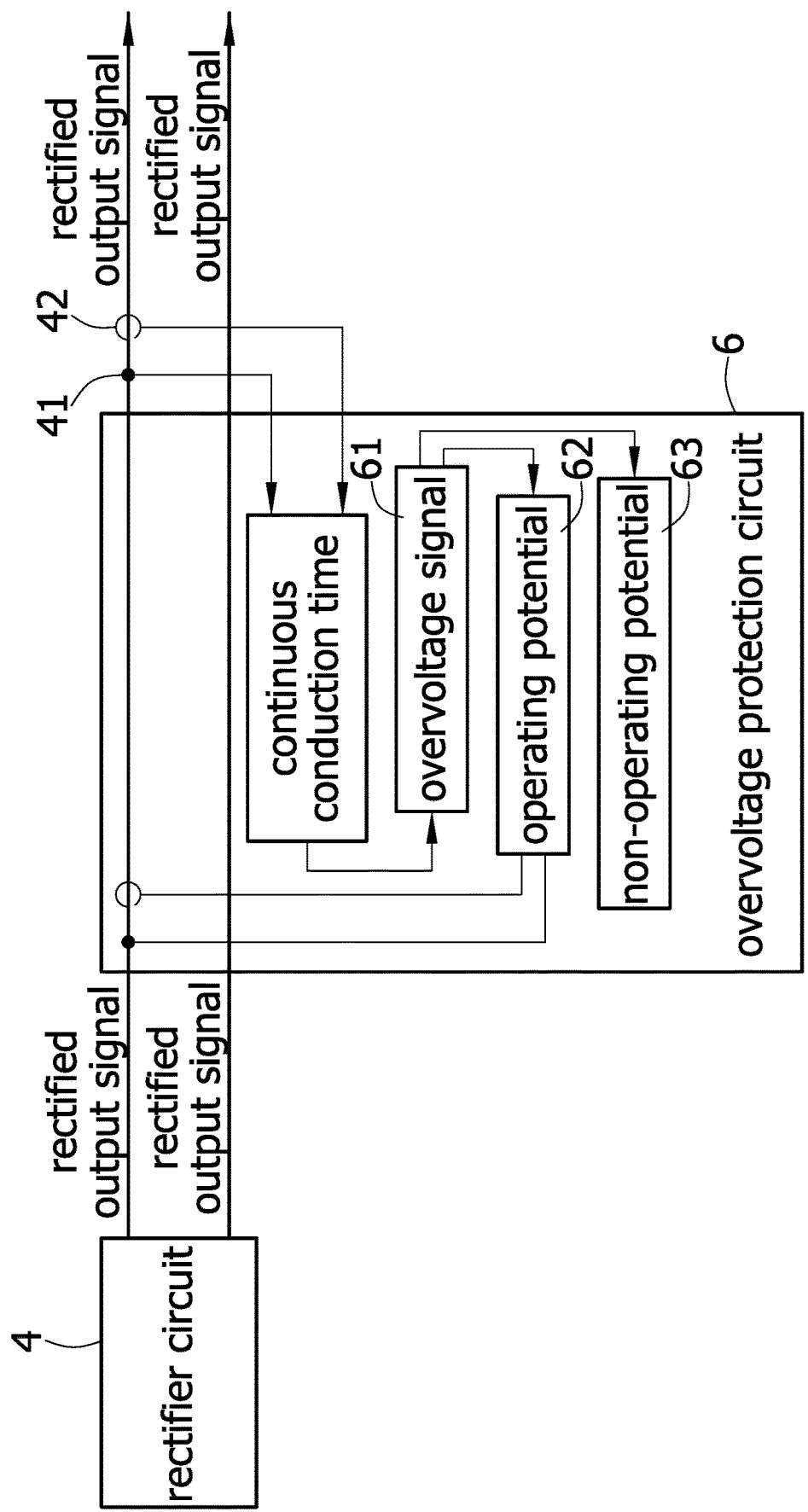
FIG. 7 is a block diagram of an overvoltage protection circuit of an embodiment according to the present invention.

As shown in FIG. 7, the overvoltage protection circuit 6 is used to check whether the rectified output signal with the power factor of the rectifier circuit 4 is higher than the overvoltage signal 61 or over a voltage threshold. If the result is yes, the overvoltage signal 61 is triggered and the overvoltage protection circuit 6 outputs the non-operating potential 63 to disconnect the rectified output signal with the power factor. For example, the rectified output signal with the power factor is turned off and a switch is used to maintain disconnection. The operating potential 62 of the overvoltage signal 61 provides over-voltage protection (OVP), over-temperature protection (OTP), over-current protection (OCP), and over-power protection (OPP), all protecting the rectifier circuit 4 and circuit connected from permanent damages.

In another preferred embodiment, the present system is restarted automatically to conduct the rectified output signal with the power factor again after the rectified output signal with the power factor being shut down. The overvoltage protection circuit 6 is used to check whether the rectified output signal with the power factor is larger than the overvoltage signal 61 within the continuous conduction time. When the rectified output signal with the power factor is smaller than the overvoltage signal 61 or a period of the rectified output signal is shorter than the continuous conduction time, the overvoltage signal 61 is at the operating potential 62. The overvoltage signal 61 is at the non-operating potential 63 while the rectified output signal with the power factor is larger than the overvoltage signal 61 or the period of the rectified output signal is longer than the continuous conduction time. The operating potential 62 and the non-operating potential 63 are a transmission high level and a transmission low level complement to each other. When the overvoltage signal 61 is at the operating potential 62, the overvoltage protection circuit 6 works to drive the rectifier circuit 4 into an overvoltage protection mode.

Figure 8:
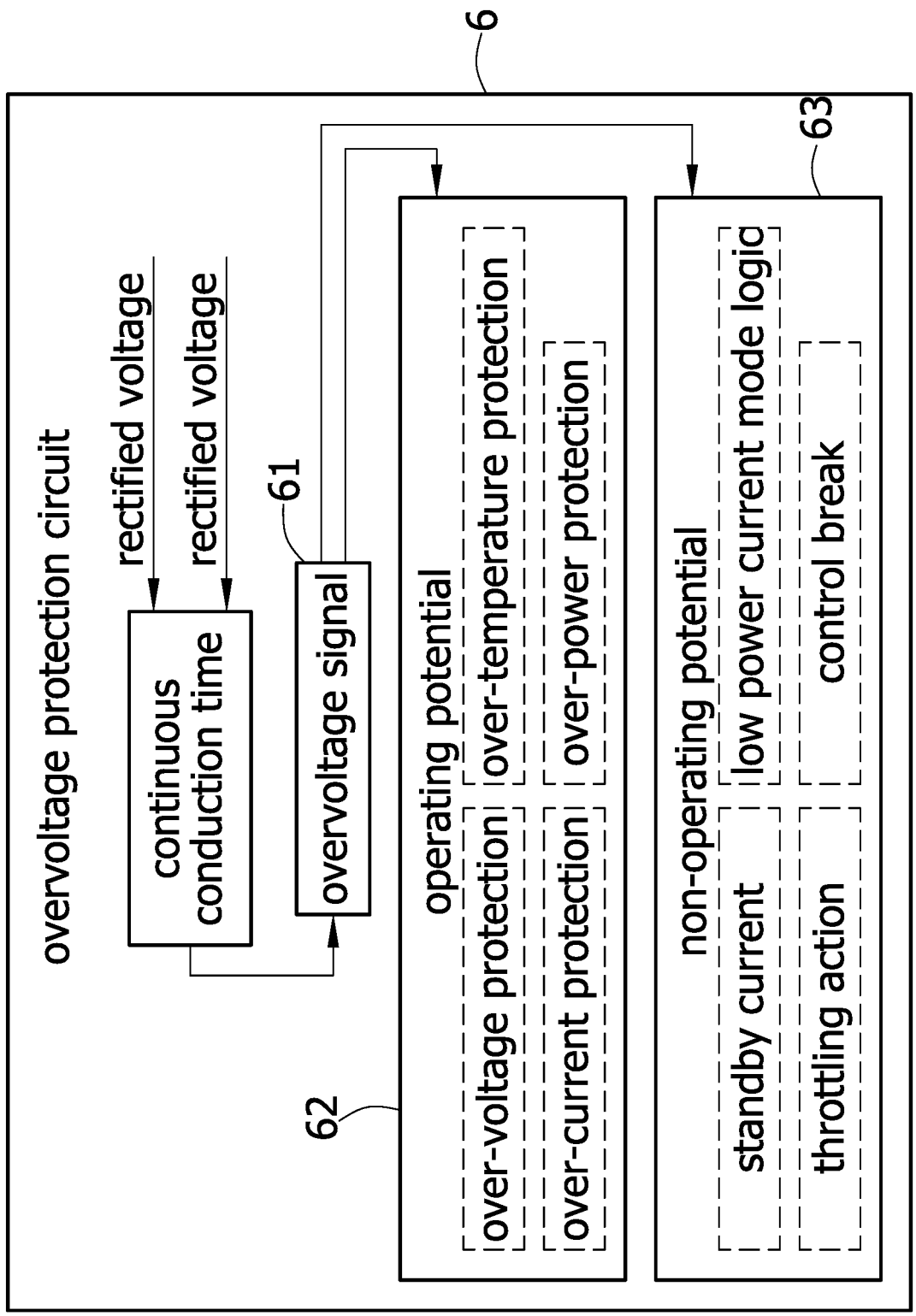
FIG. 8 is a block diagram showing an overvoltage signal, an operating potential, and a non-operating potential of an embodiment according to the present invention.

The overvoltage protection circuit 6 is arranged not only to confirm that whether the rectified output signal with the power factor of the rectifier circuit 4 is larger than an overvoltage signal 61, but also to respond and change the overvoltage signal 61 from the operating potential 62 to the non-operating potential 63 once the rectified output signal with the power factor of the rectifier circuit 4 is confirmed to be larger than an overvoltage signal 61. The overvoltage protection circuit 6 is also disposed for receiving the operating potential 62 and responding to change the operating potential 62 into the non-operating potential 63. The overvoltage protection circuit 6 generates a drive signal to make the switch disconnect and keep the switch in the disconnection for protection of the rectifier circuit 4 once the operating potential 62 is checked and changed into the non-operating potential 63 and maintained within a preset time period. As shown in FIG. 8, the rectified output signal with the power factor is monitored continuously by the operating potential 62 of the overvoltage signal 61 in order to get the OVP, the OTP, the OCP, and the OPP. According to different requirements for the non-operating potential 63, the rectified output signal is set at a standby current, a low power current mode logic, a throttling action, or a control break.

Figure 9:
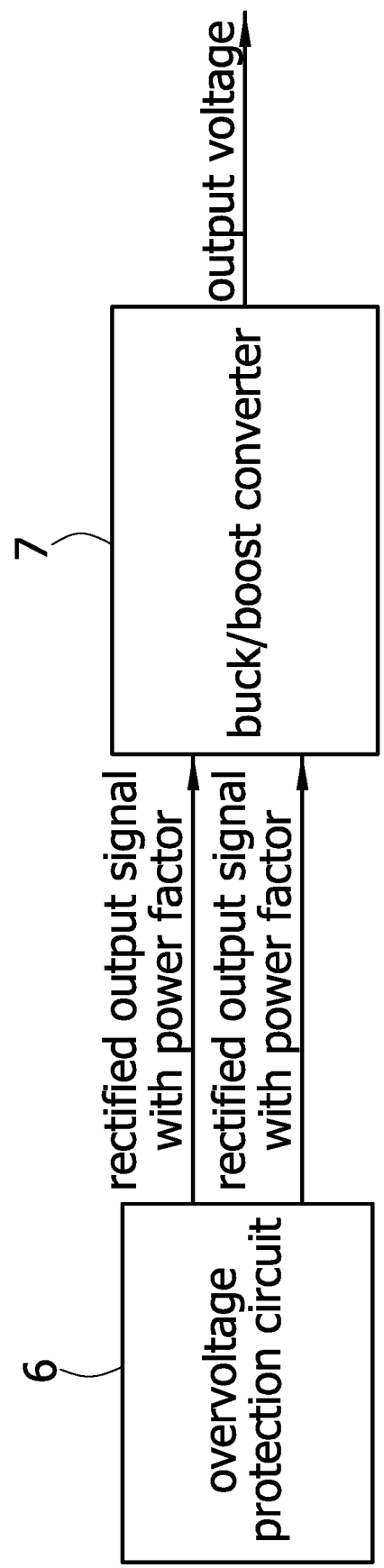
FIG. 9 is a block diagram showing a buck/boost converter of an embodiment according to the present invention.

Refer to FIG. 9, according to the power factor of the rectified output signal, the buck/boost converter 7 converts the rectified output signal to an output voltage which is supplied to the load of the low voltage power supply, the high voltage power supply, or the constant voltage power supply required. The power factor of the rectified output signal further includes a first power factor and a second power factor which can be replaced by a third power factor or a fourth power factor. The second power factor (or the third/fourth power factor) is larger than the first power factor. The ratio of the first power factor to the second power factor (or the third/fourth power factor) can be adjusted by the drive system 22.

Figure 10:
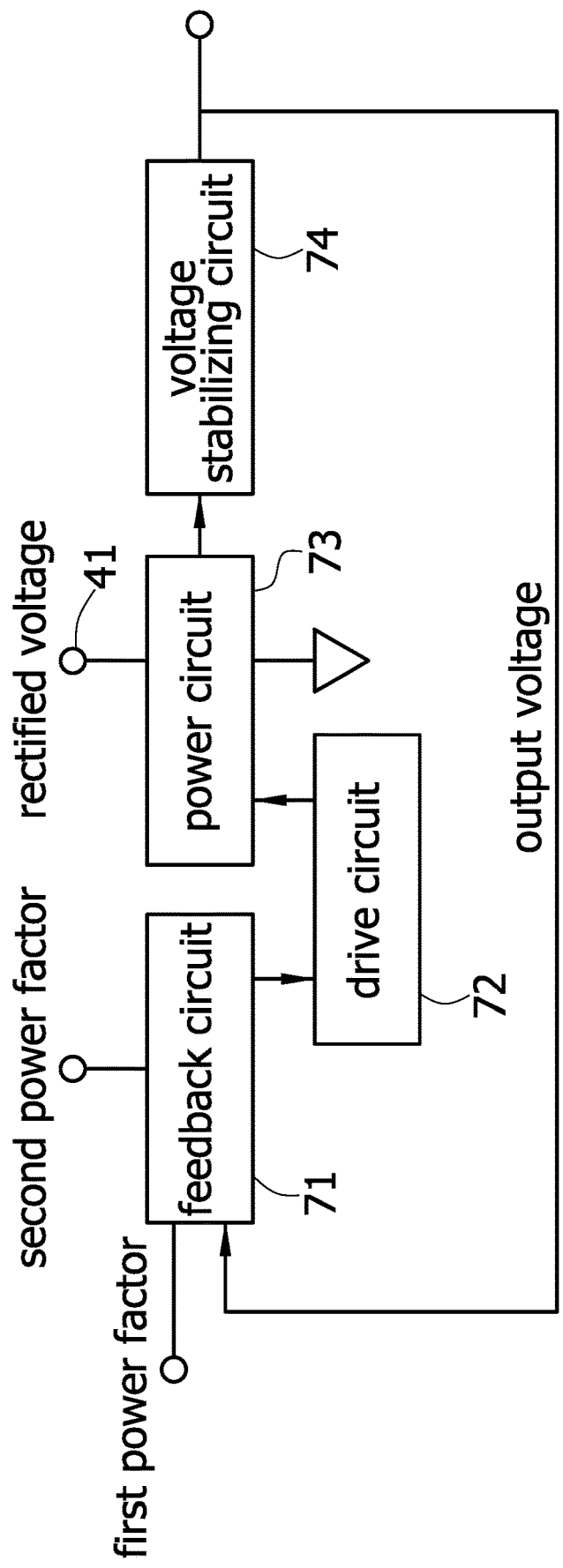
FIG. 10 is a block diagram of a buck/boost converter which receives a first power factor, a second power factor and an output voltage of an embodiment according to the present invention.
Figure 11:
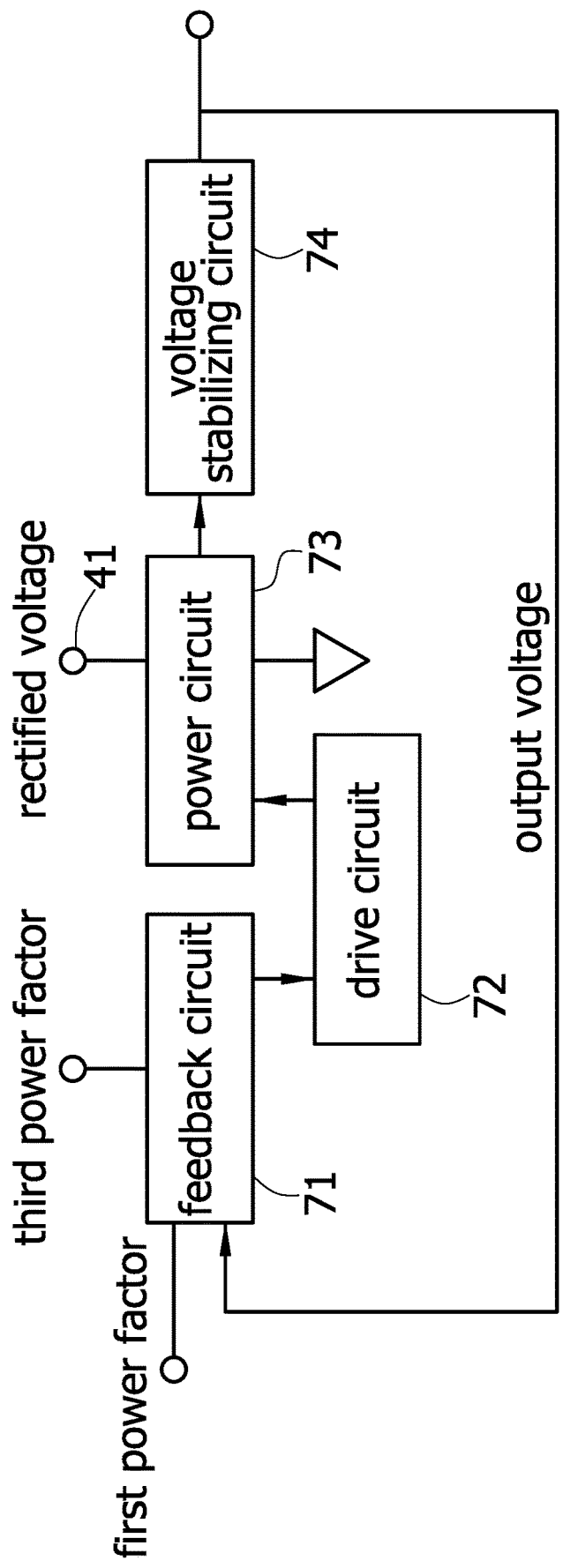
FIG. 11 is a block diagram of a buck/boost converter which receives a first power factor, a third power factor and an output voltage of an embodiment according to the present invention.
Figure 12:
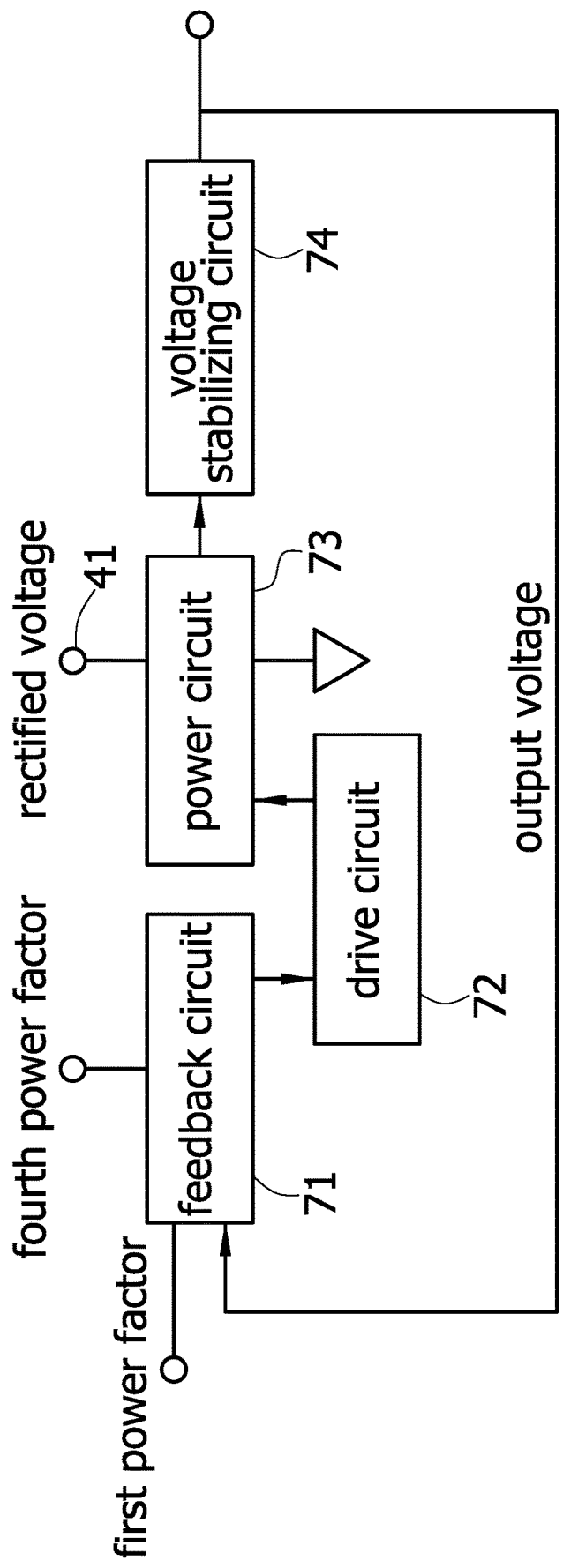
FIG. 12 is a block diagram of a buck/boost converter which receives a first power factor, a fourth power factor and an output voltage of an embodiment according to the present invention.

Refer to FIG. 10-12, the buck/boost converter 7 is used to convert the rectified voltage 41 into a lower output voltage under the condition that the output voltage is lower than the power factor. The buck/boost converter 7 includes a feedback circuit 71, a drive circuit 72, a power circuit 73, and the voltage stabilizing circuit 74.

The feedback circuit 71 receives the first power factor, the second power factor (or the third/fourth power factor), and an output voltage. While working, the feedback circuit 71 gets a feedback voltage according to the output voltage and the second power factor after receiving the first power factor, the second power factor (or the third/fourth power factor), and the output voltage and then compares the feedback voltage with the first power factor to output a control signal to the drive circuit 72 according to a result of the comparison between the feedback voltage and the first power factor.

The drive circuit 72 is coupled to the feedback circuit 71 and used for output of a drive signal to the power circuit 73 according to the modulated control signal after receiving the control signal output from the feedback circuit 71.

The power circuit 73 is coupled to the drive circuit 72 and used for connecting or disconnecting a path by which the rectifier voltage 41 provides power to the power circuit 73 according to the drive signal received from the drive circuit 72. The power circuit 73 can be a circuit composed of switches, transistors, or other switching elements and thus having switching properties.

Figure 13:
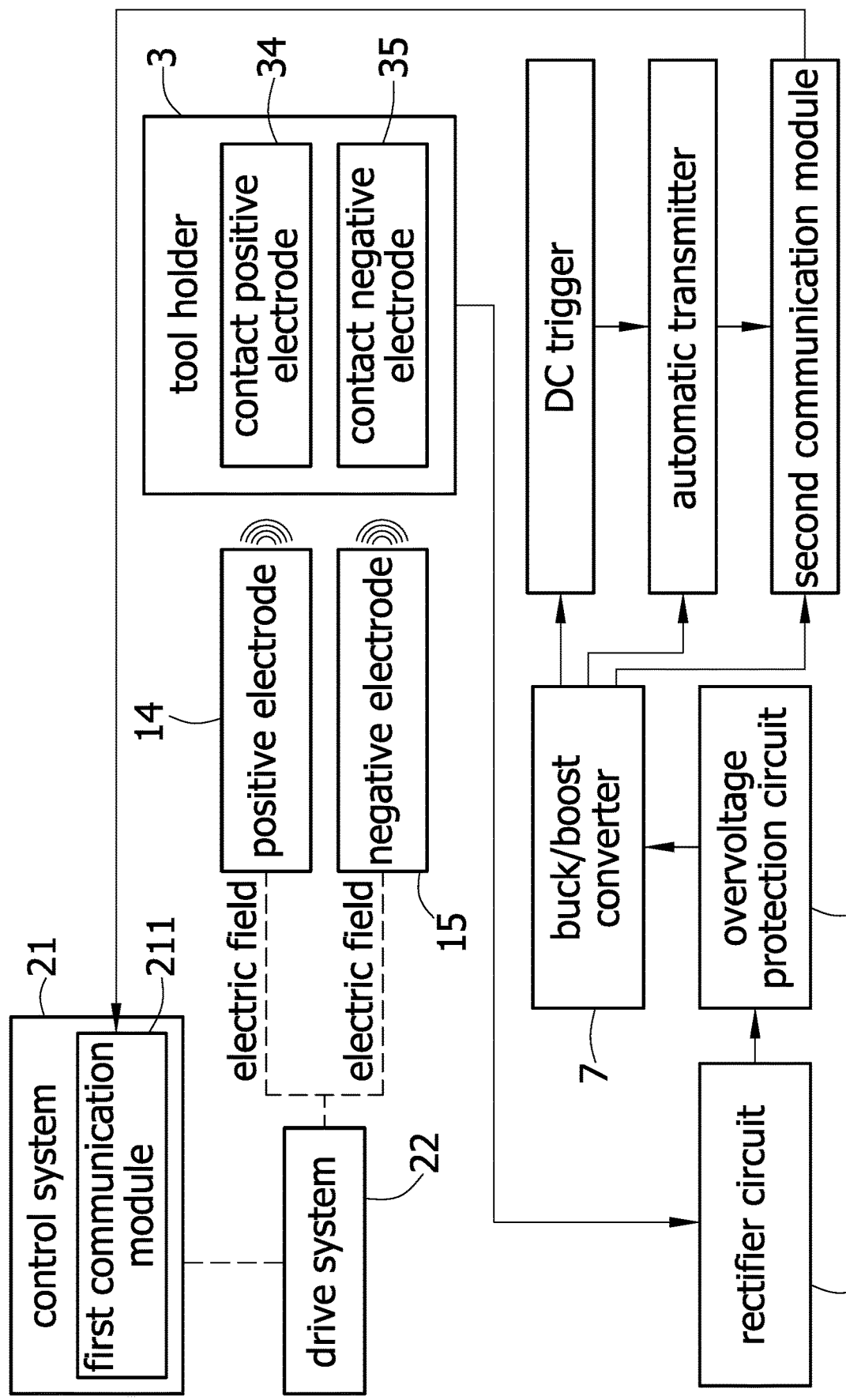
FIG. 13 is a block diagram of an embodiment showing a direct current (DC) trigger, an automatic transmitter, and a second communication module activated by an output voltage according to the present invention.

The voltage stabilizing circuit 74 is coupled to the power circuit 73. The output voltage from the power circuit 73 is stabilized by the voltage stabilizing circuit 74 and becoming a stable output voltage which is supplied to the load of the low voltage power supply (or the high voltage power supply, the constant voltage power supply). The voltage stabilizing circuit 74 can be formed by inductors and capacitors. The stable output voltage is output to the load after the current being passed through the inductors to charge the capacitors. As shown in FIG. 13, the load is a direct current (DC) trigger activated by the output voltage from the buck/boost converter 7, or a combination of a DC trigger with an automatic transmitter. The DC trigger receives the equidistant firing control from the control system 21 and deals with at least one trigger event to generate a trigger shaper. The inside of the DC trigger is coupled to an output end of a monostable trigger-action circuit or a bistable trigger circuit for generating a trigger signal according to the trigger shaper and delivering the trigger signal to the automatic transmitter. As to the trigger signal: (1) Use a standard bar to trigger the DC trigger in radial and axial directions respectively to learn positions of axial and radial trigger points of the standard bar. (2) The tool length and diameter of the standard bar are fixed values so that the tool length and diameter of the tool tested can be estimated according to position difference of trigger points obtained by the control system 21 which compares positions of the axial and radial trigger points of the standard bar obtained in the above calibration process with axial and radial trigger positions of a real tool. (3) Set runout tolerance and breakage tolerance of the real tool. After the DC trigger completes the measurement, results obtained are compared with the tool length and diameter data in the control system 21. Once the control system 21 detects that the difference is larger than the preset tolerance, a warning signal is displayed on the control system 21 to remind users that the tool breakage or big runout may occur and the use of such tool in processing will lead to poor accuracy.

The load further includes a second communication module 75. The output voltage is provided to the second communication module 75 as a power source. The second communication module 75 is electrically coupled to the automatic transmitter for transmission so that the second communication module 75 is connected to the first communication module. The second communication module 75 is mainly connected to the first communication module 211 by narrowband microwave, direct sequence spread spectrum, frequency hopping spread spectrum, shared wireless access protocol and Bluetooth of radio transmission technology while the second communication module 75 simultaneously receives the trigger signal transmitted by the automatic transmitter and delivers the trigger signal from the DC trigger to the first communication module under complete control of the automatic transmitter.

Figure 14:
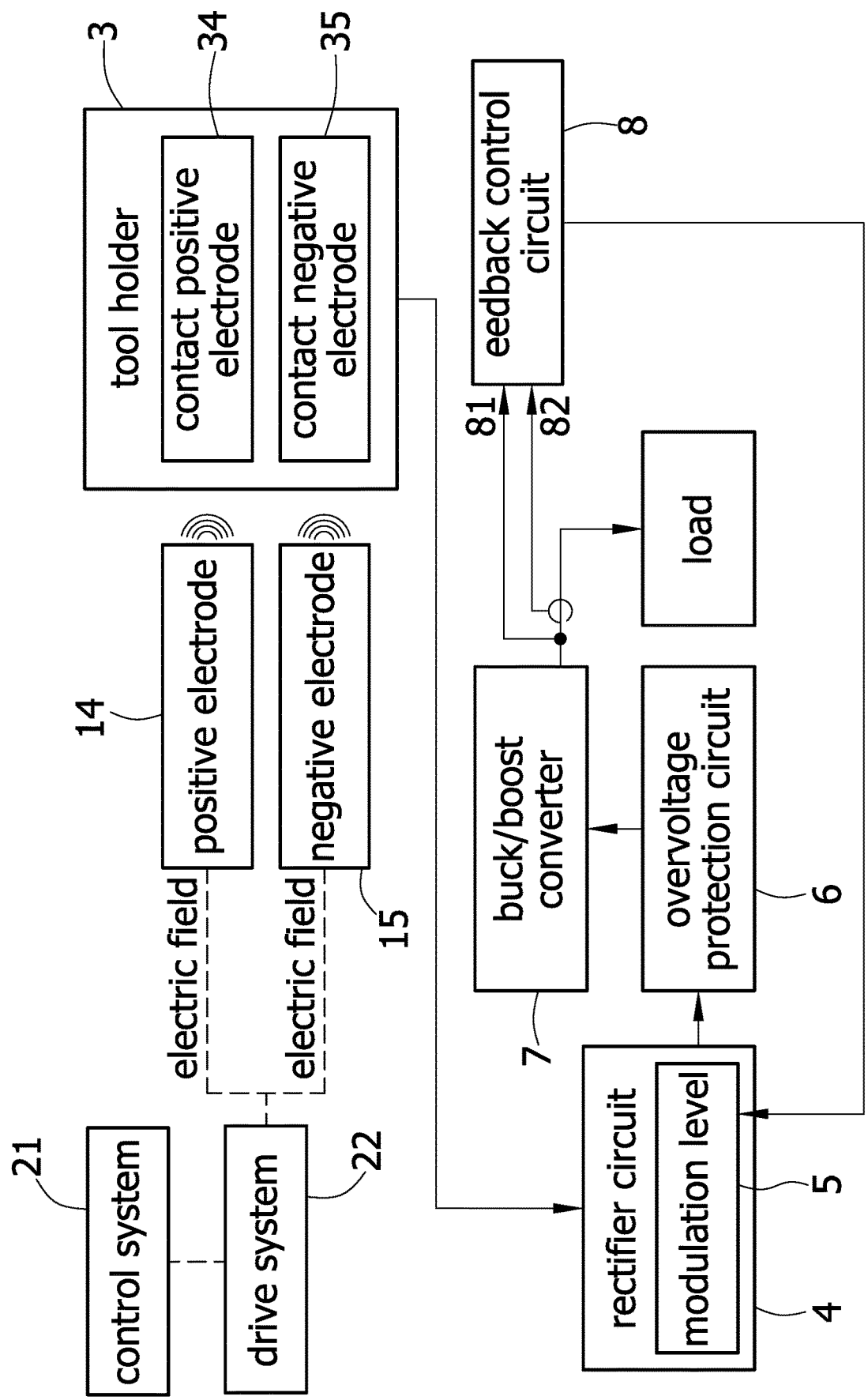
FIG. 14 is a block diagram of an embodiment showing a rectifier circuit coupled to a feedback control circuit according to the present invention.

Refer to FIG. 6 and FIG. 14, the rectifier circuit 4 is further coupled to a feedback control circuit 8 for control of the modulation level 5 in the rectifier circuit 4 according to a voltage feedback signal 81 or a current feedback signal 82 in a preferred embodiment. When the transmission level of the voltage feedback signal 81 is larger than the rectified voltage threshold 51 or the rated D.C. output voltage 52, the first equalizer circuit 55 is controlled to work. The second equalizer circuit 56 is controlled to work while the transmission level of the current feedback signal 82 is larger than the rectified current threshold 53 or the rated D.C. output current 54. The modulation level 5 is used to limit/or adjust the transmission level of the voltage feedback signal 81 or the current feedback signal 82, and further make the transmission level of the voltage feedback signal 81 not larger than the rectified voltage threshold 51 or the rated D.C. output voltage 52 or the transmission level of the current feedback signal 82 not larger than the rectified current threshold 53 or the rated D.C. output current 54.

The feedback control circuit 8 provides a time-sharing combination of a synchronous rectification conversion operation and the modulation level 5 for controlling the first equalizer circuit 55 and the second equalizer circuit 56 to adjust the transmission level of the voltage feedback signal 81 corresponding to the rated D.C. output voltage 52 and adjust the transmission level of the current feedback signal 82 corresponding to the rated D.C. output current 54 respectively. Thereby a rectifier output regulation mode is achieved. According to the rectified voltage 41 and the rectified current 42, the feedback control circuit 8 controls the first equalizer circuit 55 and the second equalizer circuit 56 to perform the synchronous rectification conversion. In the synchronous rectification conversion, the feedback control circuit 8 controls one of the first equalizer circuit 55 and the second equalizer circuit 56 to carry out synchronous rectification conversion while the other one of the first equalizer circuit 55 and the second equalizer circuit 56 is conductive.

The time-sharing combination of the synchronous rectification conversion and the modulation level 5 means the first equalizer circuit 55 and the second equalizer circuit 56 to carry out the synchronous rectification conversion and the modulation level 5 with a preset duty cycle in a periodic and time-sharing manner. For example, the duty cycle includes a first time portion and a second time portion, each of which is a period of time no larger than the duty cycle and no less than zero. The first equalizer circuit 55 and the second equalizer circuit 56 perform the synchronous rectification conversion and the modulation level 5 in the first time portion and the second time portion respectively and alternately. When the first equalizer circuit 55 performs the synchronous rectification conversion in the first time portion, the conversion second equalizer circuit 56 performs the modulation level 5 in the first time portion. When the first equalizer circuit 55 carries out the modulation level 5 in the second time portion, the conversion second equalizer circuit 56 carries out the synchronous rectification conversion in the second time portion. Thereby the above time-sharing combinations are run according to the preset duty cycle.

In the above embodiment, the first time portion and the second time portion can be arranged in turn, but not limited to. The preset duty cycle can be a fixed value or an adjustable variable value. The preset duty cycle is not limited to a fixed cycle, a time cycle generated by a frequency generator, or a duty cycle derived from operation of the modulation level 5 in the fixed first time portion or the fixed second time portion (similar to a fixed conduction), or an uncertain duty cycle.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An external power supply system for a spindle which is connected to a control system providing power to a drive system able to generate an electric field having a power factor and transfer the electric field to a positive electrode and a negative electrode comprising:

a tool holder which includes a pull stud, an exterior conical surface, an end ring, a contact positive electrode, and a contact negative electrode; the contact positive electrode and the contact negative electrode are mounted to the exterior conical surface and used for transferring an external power source having the power factor while being aligned with the positive electrode and the negative electrode of the spindle and further receiving the external power source with the power factor;

a rectifier circuit which is used for converting the external power source with the power factor into a rectified output signal with the power factor through step-down transformation; the rectifier circuit allows a transmission level to pass according to a contact potential input by the external power source, applies proportioning control with integral and derivative functions to an output waveform of the transmission level, and then transforms a modulation level which is used for control of the transmission level of the rectified output signal to be no larger than a threshold;

an overvoltage protection circuit used to check whether the rectified output signal is larger than an overvoltage signal; the overvoltage signal is at an operating potential when the rectified output signal is smaller than the overvoltage signal while the overvoltage signal is at a non-operating potential once the rectified output signal is larger than the overvoltage signal; and a buck/boost converter which is coupled to the overvoltage protection circuit for receiving the rectified output signal output at the operating potential and converting the rectified output signal to an output voltage according to the power factor of the rectified output signal; the output voltage is provided to a load of a power supply which is selected from the group consisting of a low voltage power supply, a high voltage power supply, and a constant voltage power supply.

2. An external power supply system for a spindle which is connected to a control system providing power to a drive system able to generate an electric field having a power factor and transfer the electric field to a positive electrode and a negative electrode comprising:

a tool holder which includes a pull stud, an exterior conical surface, an end ring, a contact positive electrode, and a contact negative electrode; the contact positive electrode and the contact negative electrode are mounted to a surface of the end ring and used for transferring an external power source having the power factor while being aligned with the positive and the negative electrodes of the spindle and further receiving the external power source with the power factor, a rectifier circuit which is used for converting the external power source with the power factor into a rectified output signal with the power factor through step-down transformation; the rectifier circuit allows a transmission level to pass according to a contact potential input by the external power source, applies proportioning control with integral and derivative functions to an output waveform of the transmission level, and then transforms a modulation level which is used for control of the transmission level of the rectified output signal to be no larger than a threshold;

an overvoltage protection circuit used to check whether the rectified output signal is larger than an overvoltage signal; the overvoltage signal is at an operating potential when the rectified output signal is smaller than the overvoltage signal while the overvoltage signal is at a non-operating potential once the rectified output signal is larger than the overvoltage signal; and a buck/boost converter which is coupled to the overvoltage protection circuit for receiving the rectified output signal output at the operating potential and converting the rectified output signal to an output voltage according to the power factor of the rectified output signal; the output voltage is provided to a load of a power supply which is selected from the group consisting of a low voltage power supply, a high voltage power supply, and a constant voltage power supply.

3. An external power supply system for a spindle which is connected to a control system not only providing power to a drive system and an equidistant firing control for control of a direct current trigger to deal with at least one trigger event but also receiving a trigger signal through a first communication module while the drive system is able to generate an electric field having a power factor and transfer the electric field to a positive electrode and a negative electrode comprising:

a tool holder which includes a pull stud, an exterior conical surface, an end ring, a contact positive electrode, and a contact negative electrode; the contact positive electrode and the contact negative electrode are used for receiving an external power source with the power factor while being aligned with the positive electrode and the negative electrode of the spindle;

a rectifier circuit which is used for converting the external power source with the power factor into a rectified output signal with the power factor through step-down transformation; the rectifier circuit allows a transmission level to pass according to a contact potential input by the external power source, applies proportioning control with integral and derivative functions to an output waveform of the transmission level, and then transforms a modulation level which is used for control of the transmission level of the rectified output signal to be no larger than a threshold;

an overvoltage protection circuit used to check whether the rectified output signal is larger than an overvoltage signal; the overvoltage signal is at an operating potential when the rectified output signal is smaller than the overvoltage signal while the overvoltage signal is at a non-operating potential once the rectified output signal is larger than the overvoltage signal; and a buck/boost converter which is coupled to the overvoltage protection circuit for receiving the rectified output signal output at the operating potential and converting the rectified output signal to an output voltage according to the power factor of the rectified output signal;

a direct current (DC) trigger which is activated by receiving the output voltage, then receiving the equidistant firing control from the control system to deal with the trigger event and generate a trigger shaper, and generating a trigger signal sent to an automatic transmitter according to the trigger shaper; and a second communication module which receives the output voltage to be activated; the second communication module is electrically coupled to the automatic transmitter for transmission so that the second communication module is connected to the first communication module; the second communication module is completely controlled by the automatic transmitter for sending the trigger signal from the DC trigger to the first communication module.

\* \* \* \* \*